US010935948B2

(12) United States Patent
Morin et al.

(10) Patent No.: US 10,935,948 B2
(45) Date of Patent: *Mar. 2, 2021

(54) SYSTEM AND METHOD FOR MANAGING INTERACTIONS BETWEEN A PLURALITY OF DEVICES

(71) Applicant: SYNAPTIC POWER INC., Montréal (CA)

(72) Inventors: Charles Morin, Montréal (CA); Daniel Quinz, Town of Mount Royal (CA)

(73) Assignee: SYNAPTIC POWER INC., Montréal (CA)

( * ) Notice: Subject to any disclaimer, the term of this patent is extended or adjusted under 35 U.S.C. 154(b) by 64 days.

This patent is subject to a terminal disclaimer.

(21) Appl. No.: 16/267,954

(22) Filed: Feb. 5, 2019

(65) Prior Publication Data

US 2019/0173295 A1 Jun. 6, 2019

Related U.S. Application Data

(63) Continuation-in-part of application No. 14/235,910, filed as application No. PCT/CA2012/000730 on Aug. 2, 2012, now Pat. No. 10,228,667.
(Continued)

(51) Int. Cl.
*G05B 15/02* (2006.01)
*H02J 3/14* (2006.01)
(Continued)

(52) U.S. Cl.
CPC ............ *G05B 19/0421* (2013.01); *H02J 1/14* (2013.01); *H02J 7/0021* (2013.01);
(Continued)

(58) Field of Classification Search
CPC . G05B 15/02; G05B 19/0421; H02J 13/0062; H02J 2003/146; H02J 3/14;
(Continued)

(56) References Cited

U.S. PATENT DOCUMENTS 4,649,491 A 3/1987 Manduley
5,278,771 A 1/1994 Nyenya
(Continued)

FOREIGN PATENT DOCUMENTS

WO WO 2009/155445 12/2009
WO WO 2010/002644 1/2010

OTHER PUBLICATIONS

Wang, Xiongfei, Guerrero, Josep M., Blaabjerg, Frede, Chen, Ze, A Review of Power Electronics Based Microgrids; Journal of Power Electronics, vol. 12, No. 1, Jan. 2012, pp. 181-192.
(Continued)

*Primary Examiner* — Chun Cao
(74) *Attorney, Agent, or Firm* — Pearl Cohen Zedek Latzer Baratz LLP

(57) ABSTRACT

A system is disclosed for managing interactions between a plurality of devices selected from a group consisting of energy sources, energy loads and energy storage devices, the system comprising a control bus; a power bus; a plurality of energy device interfaces, each energy device interface comprising a control bus port, a power bus port and a device port, the device port for operatively connecting the energy device interface to a corresponding device selected from the group consisting of energy sources, energy loads and energy storage devices and for controlling the corresponding device, the energy device interface being operatively connected to the control bus via the control bus port and to the power bus via the power bus port, wherein each of the plurality of energy device interfaces comprises a dedicated power agent for operating the corresponding device, wherein each dedicated power agent directly manages low level physical details associated with operating the corresponding device such that each power agent provides a normalized power interface with the power bus; a power management unit operatively connected to the control bus, the power man-
(Continued)

agement unit configured to control each of the plurality of energy device interfaces according to a determined control strategy to thereby control interactions between the plurality of corresponding devices by controlling how and when each power agent interacts with the power bus at any time wherein the low level physical details directly managed by any one of the dedicated power agents are not shared with the power management unit.

19 Claims, 10 Drawing Sheets

Related U.S. Application Data

(60) Provisional application No. 61/514,341, filed on Aug. 2, 2011.

(51) Int. Cl.
    *G05B 19/042*     (2006.01)
    *H02J 7/00*     (2006.01)
    *H02J 1/14*     (2006.01)
    *H02J 13/00*     (2006.01)
    *H02J 7/34*     (2006.01)

(52) U.S. Cl.
    CPC ........ *H02J 7/00038* (2020.01); *H02J 7/0047* (2013.01); *H02J 13/0003* (2013.01); *H02J 7/34* (2013.01); *H02J 7/345* (2013.01)

(58) Field of Classification Search
    CPC ......... H02J 3/32; H02J 4/00; H04L 12/40045; Y02B 70/3225; Y04S 20/222; Y04S 20/224
    See application file for complete search history.

(56) References Cited

U.S. PATENT DOCUMENTS

| | | | |
|---|---|---|---|
| 5,469,150 A | 11/1995 | Sitte | |
| 5,650,936 A | 7/1997 | Loucks et al. | |
| 5,659,465 A | 8/1997 | Flack et al. | |
| 6,104,967 A | 8/2000 | Hagen et al. | |
| 6,121,695 A | 9/2000 | Loh | |
| 6,586,850 B1 | 7/2003 | Powers | |
| 6,738,692 B2 * | 5/2004 | Schienbein | H02J 4/00 700/286 |
| 6,816,466 B1 | 11/2004 | Daniel | |
| 6,904,385 B1 | 6/2005 | Budike, Jr. | |
| 6,985,799 B2 | 1/2006 | Zalesski et al. | |
| 7,000,125 B2 | 2/2006 | Chapuis et al. | |
| 7,116,010 B2 | 10/2006 | Lasseter et al. | |
| 7,117,044 B2 | 10/2006 | Kocher et al. | |
| 7,181,517 B1 | 2/2007 | Lavergne et al. | |
| 7,188,003 B2 | 3/2007 | Ransom et al. | |
| 7,230,819 B2 | 6/2007 | Muchow et al. | |
| 7,274,975 B2 | 9/2007 | Miller | |
| 7,385,373 B2 | 6/2008 | Doruk et al. | |
| 7,615,966 B2 | 11/2009 | Houldsworth et al. | |
| 7,634,329 B2 | 12/2009 | Liu et al. | |
| 7,701,087 B2 | 4/2010 | Eckroad et al. | |
| 7,724,778 B2 | 5/2010 | Ying | |
| 7,747,356 B2 | 6/2010 | Andarawis et al. | |
| 7,749,380 B2 | 7/2010 | Yungner et al. | |
| 7,761,910 B2 | 7/2010 | Ransom et al. | |
| 7,772,799 B2 | 8/2010 | Wu | |
| 7,983,799 B2 | 7/2011 | Bose et al. | |
| 8,008,808 B2 | 8/2011 | Seeker et al. | |
| 8,063,604 B2 | 11/2011 | Shaffer et al. | |
| 8,103,389 B2 | 1/2012 | Golden et al. | |
| 8,115,453 B2 | 2/2012 | Houldsworth et al. | |
| 8,164,217 B1 | 4/2012 | Miller | |
| 8,180,999 B1 | 5/2012 | Oakenfull | |
| 8,648,492 B2 | 2/2014 | Craig et al. | |
| 8,760,004 B2 | 6/2014 | Weale | |
| 9,203,239 B2 | 12/2015 | Parsonnet | |
| 10,228,667 B2 * | 3/2019 | Morin | H02J 3/14 |
| 2002/0190695 A1 | 12/2002 | Wall et al. | |
| 2005/0034023 A1 | 2/2005 | Maturana et al. | |
| 2005/0049754 A1 | 3/2005 | Ogawa et al. | |
| 2005/0108453 A1 | 5/2005 | Maturana et al. | |
| 2006/0190745 A1 * | 8/2006 | Matsushima | G06F 1/3203 713/300 |
| 2006/0210841 A1 | 9/2006 | Wallace et al. | |
| 2009/0093916 A1 | 4/2009 | Parsonnet et al. | |
| 2009/0108552 A1 | 4/2009 | Mann, III et al. | |
| 2009/0249089 A1 | 10/2009 | Tremel et al. | |
| 2009/0249090 A1 | 10/2009 | Schmitz et al. | |
| 2009/0322151 A1 | 12/2009 | Ferlitsch | |
| 2009/0326724 A1 | 12/2009 | Lasseter et al. | |
| 2010/0102625 A1 | 4/2010 | Karimi et al. | |
| 2010/0121511 A1 | 5/2010 | Onnerud et al. | |
| 2010/0141210 A1 | 6/2010 | Shaffer, Jr. | |
| 2010/0198421 A1 | 8/2010 | Fahimi et al. | |
| 2010/0207448 A1 | 8/2010 | Cooper et al. | |
| 2010/0207728 A1 | 8/2010 | Roscoe et al. | |
| 2010/0305792 A1 | 12/2010 | Wilk et al. | |
| 2011/0089760 A1 | 4/2011 | Castelaz et al. | |
| 2011/0106321 A1 | 5/2011 | Cherian et al. | |
| 2011/0121781 A1 | 5/2011 | Burke et al. | |
| 2012/0065803 A1 | 3/2012 | Teichmann et al. | |
| 2012/0078431 A1 | 3/2012 | Weatherhead | |
| 2012/0080942 A1 | 4/2012 | Carralero et al. | |
| 2012/0131245 A1 | 5/2012 | Wilcox | |
| 2012/0143385 A1 | 6/2012 | Goldsmith | |
| 2012/0150679 A1 | 6/2012 | Lazaris | |
| 2012/0193987 A1 | 8/2012 | Siglock | |
| 2012/0215368 A1 | 8/2012 | Sharma | |
| 2012/0299386 A1 | 11/2012 | Kaufman et al. | |
| 2013/0015821 A1 | 1/2013 | Kim et al. | |
| 2013/0035802 A1 | 2/2013 | Khaitan et al. | |
| 2013/0046415 A1 | 2/2013 | Curtis | |
| 2013/0070377 A1 | 3/2013 | Hillis et al. | |
| 2014/0265585 A1 | 9/2014 | Sera et al. | |
| 2014/0284998 A1 | 9/2014 | Brennan et al. | |

OTHER PUBLICATIONS

Lagorse, Jérémy, Simoes, Marcelo G.; A Multiagent Fuzzy-Logic-Based Energy Management of Hybrid Systems; IEEE Transactions on Industry Applications, vol. 45, No. 6, Nov./Dec. 2009, pp. 2123-2129.

Jiang, Zhenhua; Agent-based power sharing scheme for active hybrid power sources; Journal of Power Sources 1977 (2008), pp. 231-238.

Guo, Jinghong; Distributed, Modular, Open Control Architecture for Power Conversion Systems; dissertation submitted to Faculty of Virginia Polytechnic Institute and State University in fulfilment of the requirements for the degree of Doctor of Philosophy in Electrical and Computer Engineering, May 13, 2005.

Moyet, J. Ortiz, Menicucci, David; Advanced Concepts for Controlling Energy Surety Microgrids; Sandia National Laboratories, Report No. SAND2011-5048, May 2011.

Bryan, J., Duke, R., Sound, S.; Decentralised Control of a Nanogrid; Department of Electrical and Computer Engineering, University of Canterbury, Sep. 2003.

Hamar, Janos, Bartal, Peter, Sepri, Daniel T.; Energy-Efficient Electrical Power Distribution with Multi-Agent Control at Parallel DC/DC Converters; World Academy of Science, Engineering and Technology, 74 2011.

Nordman, Bruce; Nanogrids—Evolving our electricity system from the bottom up; Environmental Energy Technologies Division, Lawrence Berkeley National Laboratory, California, May 2010.

Agrawal, Meena, Mittal, Arvind; Overview of Multi-Agent Approach for Micro-Grid Energy Management; IOSR Journal of Electrical and Electronics Engineering (IOSR-JEEE), e-ISSN: 2278-1676, p-ISSN: 2320-3331, vol. 9, Issue 2, Ver. III (Mar.-Apr. 2014), pp. 1-7.

(56) References Cited

OTHER PUBLICATIONS

Ding, Yong, Decker, Christian, Vassileva, Iana, Wallin, Fredrik, Beigl, Michael; A Smart Energy System: Distributed Resource Management, Control and Optimization; IEEE, Dec. 2011.
Nemirow, David C., Martinez, Ralph; Architecting the Microgrid for Interoperability; Balance Energy, San Diego, California, 2007.
Wu, Jie, Chen, Sizhe, Zeng, Jun, Gao, Lamei; Control Technologies in Distributed Generation System Based on Renewable Energy; Asian Power Electronics Journal, vol. 3, No. 1, Sep. 2009.
Pipattanasomprom, Manisa, Feroze, Hassan, Rahman, Saifur; Securing critical loads in a PV-based microgrid with a multi-agent system; Renewable Energy (2011) 1-9.

* cited by examiner

SYSTEM AND METHOD FOR MANAGING INTERACTIONS BETWEEN A PLURALITY OF DEVICES

CROSS REFERENCE TO RELATED APPLICATION

The present application is a continuation-in-part of U.S. patent application Ser. No. 14/235,910, filed on May 27, 2014, which is a US national phase application of International Patent Application No. PCT/CA2012/00073, filed Aug. 2, 2012, which claims the benefit of U.S. Provisional Patent Application No. 61/514,341, filed Aug. 2, 2011.

FIELD OF THE INVENTION

The invention pertains to electronics. More precisely, this invention pertains to a system and method for managing interactions between a plurality of devices.

BACKGROUND OF THE INVENTION

Connecting electrical devices together can be sometimes complicated to achieve.

A first issue is for multiple energy sources to accurately charge multiple batteries concurrently. In some applications such as in boating, typical energy subsystems are often challenged by the ability to accurately charge more than one accumulator from a plurality of energy sources. Common designs make use of battery combiners and battery isolators, which fail to apply best suited multistage charging to each individual accumulator, and further fail to ensure each accumulator is maintained optimally charged, hence compromising autonomy and decreasing battery life.

Another issue is that a typical power subsystem made of multiple components is inflexible with regards to customization and upgradeability; rendering most changes complex to realize (e.g. adding a supplementary energy source or storage device requires matching new devices power characteristics, ensuring electrical safety compliance is met, accounting for intricate physical integration requirements, carry-out proper electrical rewiring, etc.).

Another issue is that if they are properly connected, the electrical devices are usually unable to readily communicate together with the aim of optimizing power performance. This is due to the fact that each device may have a proprietary communication standard or protocol, or simply have no communication present (e.g. a battery charger, a switch or a selector, etc.).

Another issue is that when dynamic information and/or remote controls of an electrical power device is made available to the user, the absence of an interoperable interface renders the interconnection to the plurality of electrical devices together complicated to achieve and to then manage.

Another issue pertains to the expertise required by end users and owners in the modification, customization, maintenance and operation of an existing energy subsystem. In reference to the above, experts versed in electrical systems design are generally required to perform modifications to an energy subsystem as to ensure it operates as intended, is designed with optimal efficiency and meets safety regulation. The same applies to maintaining and operating an energy subsystem optimally in all circumstances. Experience indicates that inadequate expertise resulted in: compromised energy supply, equipment failure and damage, shorten components life, increased costs, and further raise safety concerns that even resulted in loss of life and property.

There is a need for a method and apparatus that will overcome at least one of the above-identified drawbacks.

Features of the invention will be apparent from review of the disclosure, drawings and description of the invention below.

BRIEF SUMMARY OF THE INVENTION

According to an embodiment there is provided a system for managing interactions between a plurality of devices selected from a group consisting of energy sources, energy loads and energy storage devices, the system comprising a control bus, a power bus, a plurality of energy device interfaces, each energy device interface comprising a control bus port for operatively connecting the energy device interface to the control bus, a power bus port for operatively connecting the energy device interface to the power bus and a device port for operatively connecting the energy device interface to a device selected from the group consisting of energy sources, energy loads and energy storage devices and for controlling said device selected from the group consisting of energy sources, energy loads and energy storage devices, a power management unit operatively connected to the control bus, the power management unit comprising a control strategy determining unit, the power management unit being adapted for controlling each of the plurality of energy device interfaces according to the determined control strategy to thereby control interactions between the plurality of devices.

In accordance with one embodiment, the energy sources are selected from a group consisting of utility grid, fuel cells, alternators, generators, energy sources using regenerative braking systems, energy sources using geothermal power and energy sources using nuclear power, high and low-power energy harvesting technologies including photovoltaic power generation, wind generators, hydro generators, etc.

In accordance with an embodiment, the energy storage devices are selected from a group consisting of battery arrays and batteries, super-capacitors, flywheels, devices using compressed air storage, devices using pumped hydro storage, devices using gravity and devices using thermal energy storage.

In accordance with a further embodiment, the control strategy is determined using at least one of user-specified parameters, constraints and goals.

In accordance with yet another embodiment, each of the plurality of energy device interfaces comprises a dedicated power agent for operating a corresponding device selected from the group consisting of energy sources, energy loads and energy storage devices.

In accordance with an embodiment, the dedicated power agent receives a power request instruction from the power management unit via the control bus and operates the corresponding device accordingly.

In accordance with another embodiment, each of the plurality of energy device interfaces is adapted to ensure a given power setting is maintained over time In accordance with an embodiment, a closed realtime control loop is used for ensuring the given power setting is maintained over time.

In accordance with another embodiment, the power management unit receives a feedback signal from at least one of the plurality of dedicated power agents.

In accordance with another embodiment, at least one energy device interface receives a feedback signal from a corresponding device selected from a group consisting of energy sources, energy loads and energy storage devices to which the energy device interface is connected to.

In accordance with a further embodiment, the feedback signal comprises at least one of presence or absence of power originating from the corresponding energy device, sensor reading from the corresponding energy device, data originating from the corresponding energy device.

In accordance with one embodiment, the power management unit further receives data from an additional information source.

In accordance with yet another embodiment, the control bus operates using a packet-switched communication protocol.

In accordance with another embodiment, the communication protocol comprises CAN (Controller Area Network) communication protocol.

In accordance with yet another embodiment, the power management unit further generates instructions to be transmitted to the dedicated power agent, the instructions being selected from a group consisting of an instruction for setting power limits, an instruction for reporting data associated with a current state of the dedicated power agent, an instruction for determining a presence or an absence of the dedicated power agent, an instruction for establishing control set points, an instruction for establishing agent calibration, an instruction for performing a diagnostic management of the dedicated power agent, an instruction for providing a firmware update functionality for the dedicated power agent, an instruction for gathering operational statistics from the dedicated power agent, an instruction for determining a containment and management of the dedicated power agent, an instruction for obtaining data associated with a specific dedicated energy device to which the dedicated power agent is connected to.

In accordance with another embodiment, the dedicated power agent is used for operating a dedicated energy source from the plurality of energy sources, wherein the instructions further comprise at least one of an instruction for determining an energy cost of the dedicated energy source, an instruction for determining a maximum power production for the dedicated energy source and an instruction for determining the readiness of the dedicated energy source.

In accordance with another embodiment, the dedicated power agent is used for operating a dedicated energy load from the plurality of energy loads, wherein the instructions further comprise an instruction for determining a maximum power consumption for the dedicated energy load.

In accordance with an embodiment, the dedicated power agent is used for operating a dedicated energy storage device from the plurality of energy storage devices, wherein the instructions further comprise at least one of an instruction for determining an energy a total storage capacity for the dedicated energy storage device, and an instruction for determining an available reserve in the dedicated energy storage device, an instruction for configuring the dedicated energy storage device for being in charging state, a discharging state and a non-participating state.

In accordance with another embodiment, the power management unit is further adapted for performing at least one of logging power consumption/production/storage statistics, determining if the dedicated power agent will contribute at any particular time, determining if the dedicated power agent is calibrated, calibrating the dedicated power agent if the dedicated power agent is not calibrated, keeping track of operating statistics for the dedicated power agent, scheduling the dedicated power agent, optimizing energy costs based on feedback from the dedicated power agent and performing predictive maintenance in the case where the dedicated power agent supports such feature.

In accordance with another embodiment, the power management unit further comprises a communication port for enabling a connection to a processing unit.

In accordance with an embodiment, the processing unit comprises a server.

In accordance with another embodiment, the processing unit is one of a laptop, a desktop, a tablet computer and a smartphone.

In accordance with another embodiment, the processing unit comprises a GPS receiver.

In accordance with another embodiment, the processing unit is used for enabling a user to interact with the power management unit.

In accordance with an embodiment, the processing unit is used for providing data, further wherein the data provided by the processing unit is used by the control strategy determining unit for generating the control strategy.

In accordance with another embodiment, the processing unit is used for providing data, further wherein the data provided by the processing unit is used by the plurality of energy device interfaces.

In accordance with another embodiment, the data is generated by a user.

In accordance with another embodiment, the processing unit further receives data from the power management unit.

In accordance with a further embodiment, the data is one of an energy generation priority, a threshold value, a schedule and a time of day to be set in order to disable energy supply to a specific load.

In accordance with another aspect of the invention, there is provided a method for managing interactions between a plurality of devices selected from a group consisting of energy sources, energy loads and energy storage devices, the method comprising providing a system comprising a control bus; a power bus; a plurality of energy device interfaces, each energy device interface comprising a control bus port for operatively connecting the energy device interface to the control bus, a power bus port for operatively connecting the energy device interface to the power bus and a device port for operatively connecting the energy device interface to a device selected from the group consisting of energy sources, energy loads and energy storage devices and for controlling said device selected from the group consisting of energy sources, energy loads and energy storage devices; a power management unit operatively connected to the control bus, the power management unit comprising a control strategy determining unit, the power management unit being adapted for controlling each of the plurality of energy device interfaces according to the determined control strategy to thereby control interactions between the plurality of devices; operatively connecting each of the plurality of devices selected from a group consisting of energy sources, energy loads and energy storage devices to a corresponding energy device interface of the plurality of energy device interfaces; determining a control strategy using an identification of the plurality of devices selected from a group consisting of energy sources, energy loads and energy storage devices; applying the determined control strategy to thereby manage the interactions between the plurality of devices.

In accordance with an embodiment, the method further comprises a user providing at least one of user-specified parameter data, constraint data and goals data, further wherein the control strategy is determined using the provided at least one of user-specified parameter data, constraint data and goals data.

In accordance with another embodiment, the method further comprises operatively connecting the power management unit of the system to a processing unit, and further receiving data from the processing unit.

In accordance with another embodiment of the method, the data received from the processing unit is provided by the user, further wherein the control strategy is determined using the data received from the processing unit.

An advantage of the system disclosed is that each energy device interface is responsible for managing a given one of an energy source, an energy load and an energy storage device in accordance with a given control strategy.

Another advantage of the system disclosed is that a single control bus is shared amongst each of the plurality of energy device interfaces and the power management unit.

Another advantage of the system disclosed is that the power management unit deals with a normalized power bus and sees each device connected to each one of the plurality of energy device interfaces as one of an energy source, an energy load and an energy storage device accessing the power bus and does not deal with low level operating details associated with a given device.

Another advantage is the temporal and material decoupling of the individual energy agent control algorithms from each other and the power manager. This allows for independent design optimization on a per energy device interface basis (ex: faster, more expensive microcontrollers for some energy device interfaces and slower, less expensive microcontrollers for others, depending on the energy load, source, or storage characteristics). For example, a fixed solar panel energy device interface is simpler than a diesel engine control agent with start/stop and RPM control, fuel level monitoring, etc.

Another advantage is the ability to easily scale or adapt an installation by either adding, removing, or changing individual energy agent modules with minimal or zero impact on existing modules. The net impact of the change on the overall control strategy is encapsulated totally in the power management unit. In short, this architecture provides a plug-and-play approach to power system engineering.

Another advantage is the ability to make extensive alterations to energy agents (ie: cost reduction, adaptation to future technology improvements, energy systems redesign, etc.) while keeping 100% backward compatibility with the power master unit and other energy agent modules.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced. It will be understood that other embodiments may be made without departing from the scope of the invention disclosed.

Figure 1:
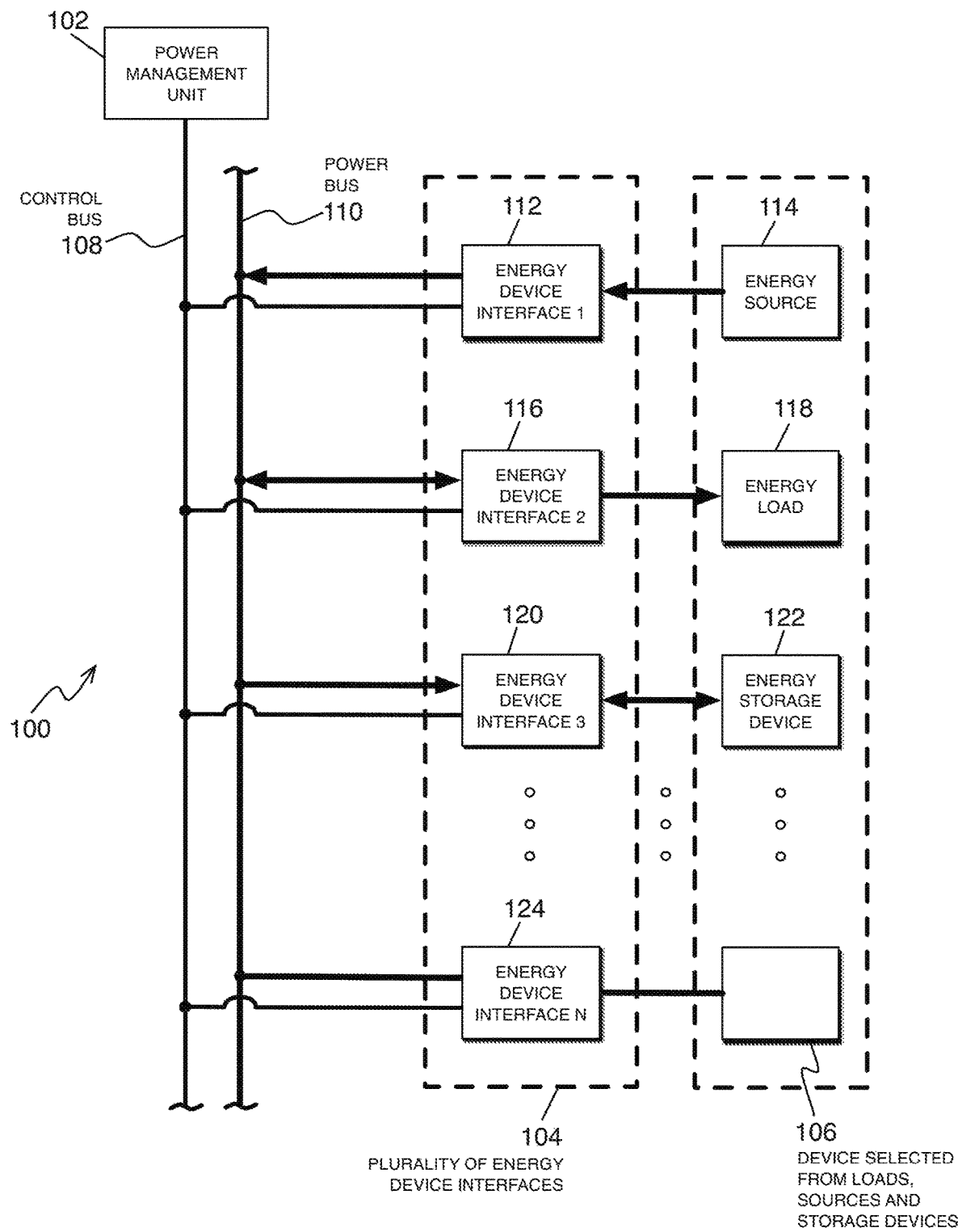
FIG. 1 is a block diagram which shows an embodiment of a system for managing interactions between a plurality of devices selected from a group consisting of energy sources, energy loads and energy storage devices.

Now referring to FIG. 1, there is shown an embodiment of a system for managing interactions between a plurality of devices selected from a group consisting of energy sources, energy loads and energy storage devices.

It will be appreciated that the energy sources may be any type of energy sources. In one embodiment, the energy source is selected from a group consisting of the utility grid, fuel cells, alternators, generators, regenerative braking systems, energy sources using geothermal power and energy sources using nuclear power, high and low-power energy harvesting technologies including photovoltaic power generation, wind generators, hydro generators, etc.

It will be appreciated that the energy loads may be any type of energy loads. Some examples are low-voltage, low-current DC loads as may be found in radios, GPS receivers, smartphone charger, LED lights, etc. Low-voltage, high-current DC loads such as motor starters, winch motors, solar panel actuators, etc., High-voltage AC loads such as computers, stove, air conditioning unit, etc. It will be appreciated by the skilled addressee that various other alternative embodiments may be possible.

It will be appreciated that the energy storage device may be any type of energy storage device. In one embodiment, the energy storage device is selected from a group consisting of battery arrays and batteries, super-capacitors, flywheels, devices using compressed air storage, devices using pumped hydro storage, devices using gravity and devices using thermal energy storage, etc.

Still referring to FIG. 1, the system 100 comprises a power management unit 102, a plurality of energy device interfaces 104, a plurality of devices selected from loads, sources and storage devices 106, a control bus 108 and a power bus 110.

In fact, the power management unit 102 is operatively connected to each of the plurality of energy device interfaces 104 using the control bus 108 and the power bus 110.

Each of the plurality of energy device interfaces 104 is operatively connected to corresponding devices selected from loads, sources and storage devices 106. In the example disclosed in FIG. 1, the plurality of energy device interfaces 104 comprises energy device interface 1 (112), energy device interface 2 (116), energy device interface 3 (120) and energy device interface N (124). The plurality of devices selected from loads, sources and storages devices comprises energy source 114, energy load 118, energy storage device 122 and device 106.

As mentioned above, the power management unit 102 is operatively connected to the power bus 110. It will be appreciated that the power management unit 102 comprises a control strategy determining unit (not shown) for determining a control strategy.

In fact, the power management unit 102 is adapted for controlling each of the plurality of energy device interfaces 104 according to the determined control strategy to thereby control interaction between the plurality of devices.

More precisely, it will be appreciated that the power management unit 102 is responsible for the inter-operation of each of the plurality of energy device interfaces 104 and for the execution of a determined control strategy. It will be appreciated that in an alternative embodiment, a fallback operation may be provided for ensuring that each of the plurality of energy device interfaces 104 operates for instance in case of a failure of the power management unit 102. In such embodiment, each of the plurality of energy devices interfaces 104 will be provided with resources to operate on a self-manage, self-federated fallback mode.

In a preferred embodiment, the control strategy is determined using user-specified parameters, constraints and goals for instance.

Figure 2:
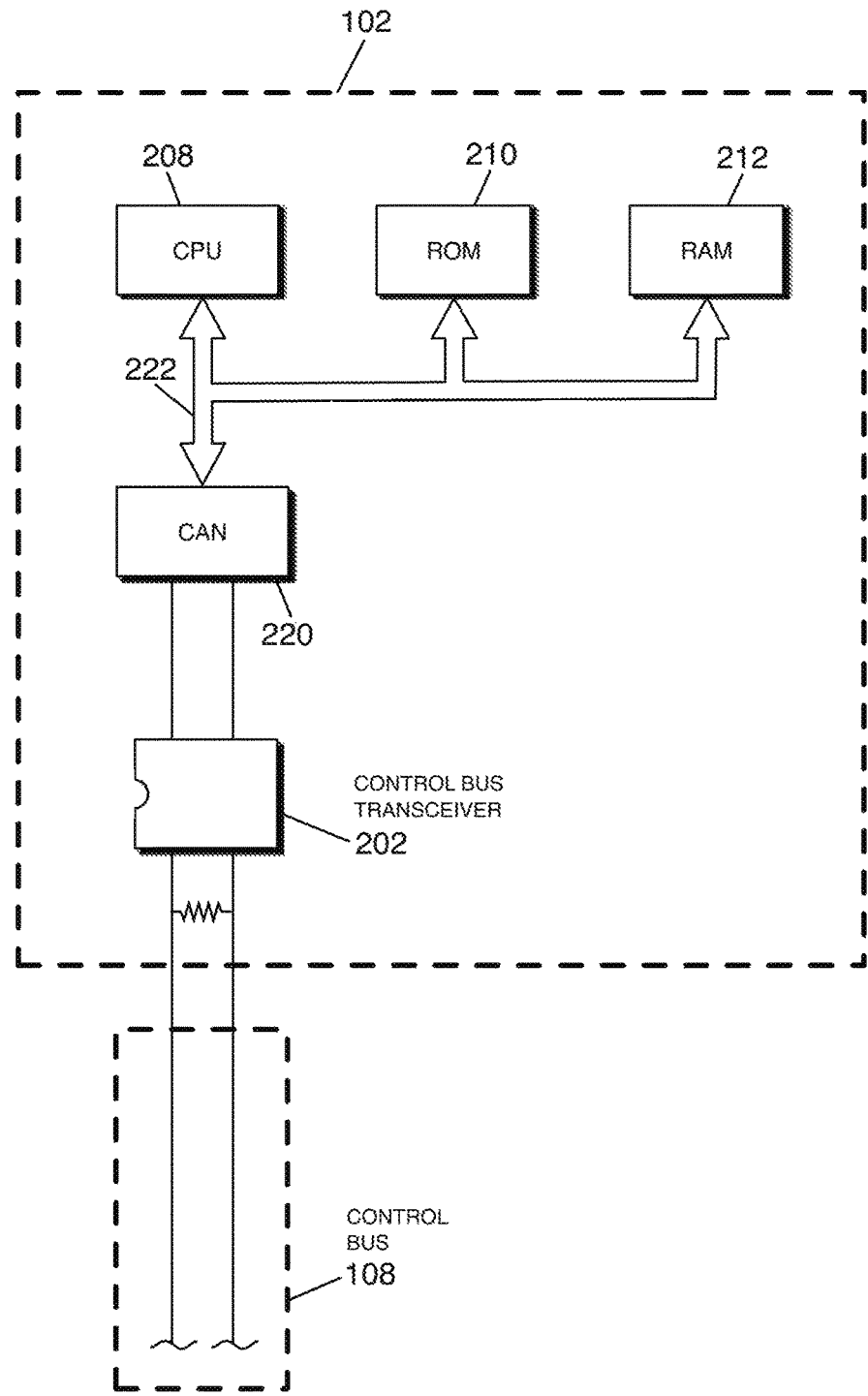
FIG. 2 is a block diagram which shows an embodiment of a power management unit.

Now referring to FIG. 2, there is shown an embodiment of the power management unit 102.

In this embodiment, the power management unit 102 comprises a CPU 208, non-volatile memory (ex: ROM, Flash, EEPROM, etc.) 210, and random-access memory (RAM) 212, a CAN interface 220 and a control bus transceiver 202.

Each of the CPU 208, the non-volatile memory (ex: ROM, Flash, EEPROM, etc.) 210, the RAM 212 and the CAN interface 220 is operatively interconnected via a data bus 222. The control bus 108 is further connected to the CAN interface 220 via a control bus transceiver 202. In a preferred embodiment the control bus transceiver 202 is TJA 1040 manufactured by NXP. Alternatively, an embedded PC may be used as an alternative solution as the processing core of the power management unit 102.

In an alternative embodiment, the power management unit 102 can be connected to the power bus 110. In this alternative embodiment, the power management unit 102 can dynamically monitor the voltage of the power bus 110.

In a preferred embodiment, 208, 210, 212, 220, and 222 are all comprised into a single microcontroller unit such as an LPC1850FET256 manufactured by NXP.

As mentioned above, it will be appreciated that the power management unit 102 is used, inter alia, for managing the inter-operation of each of the plurality of energy device interfaces 104 and for executing a control strategy defined using user-specified parameters, constraints and goals. It will be appreciated this is performed via the control bus 108.

It will be appreciated that a power agent is running in each of the plurality of energy device interfaces 104. In a preferred embodiment, the power agent is a microprocessor-controlled interface that encapsulates all of the details regarding a given one of an energy source, an energy load and an energy storage device connected to the energy device interface. The power agent provides a normalized power interface with the power bus 110.

Moreover, it will be appreciated that certain aspects of the details of the algorithms of a power agent are not shared with the power management unit 102. This creates a level of abstraction between the power management unit 102 and the power agent.

It will be appreciated that the power agent can be controlled by the power management unit 102.

The power agent encapsulates all logic circuitry, and control algorithms required for enabling a connection of a corresponding energy device interface to the power bus 110.

In a preferred embodiment, the power agent associated with a corresponding energy device interface comprises a micro controller with on-chip ADC, DAC, analog output conditioning module (represented as a PWM unit on the drawing) device, digital I/O unit and associated control firmware designed for controlling a specific device that will be connected to the corresponding energy device interface. It will be therefore appreciated that the control firmware will typically actuate peripherals to drive analog and/or digital elements required to perform the necessary power conversion function (e.g. charge an energy storage device, drive an energy load or regulate an energy source connected to the energy device interface).

The power agent typically receives a power request from the power management unit 102 and operates its local hardware in order to respond to the request in a timely fashion.

It will be appreciated that each of the plurality of energy device interfaces is adapted to ensure a given power setting to the power bus 110 is maintained over time. In one embodiment, a closed real-time control loop is used for ensuring the given power setting to the power bus 110 is maintained over time.

By combining user parameters with feedback obtained from each of the plurality of power agents as well as with data originating from additional optional information sources, such as for instance weather forecast information, geographic position, temperature, time of day, navigation system data, etc., the power management unit 102 is capable of driving each of the power agents to meet specific energy management goals.

Also, it will be appreciated that at least one energy device interface may receive a feedback signal from a corresponding device selected from a group consisting of energy sources, energy loads, and energy storage devices to which the energy device interface is connected to. The feedback signal may comprise at least one of presence or absence of power originating from the corresponding energy device (e.g device is active or not), sensor reading from the corresponding energy device (e.g. heat sensor, fuel reservoir level, etc.), data (e.g. engine control interface, battery management system (BMS) communication interface, etc.) originating from the corresponding energy device.

It will be appreciated that a key aspect of the system disclosed herein is that the power management unit 102 does not deal directly with "low level", physical details associated with each interaction between one of an energy source, an energy load and an energy storage device and a corresponding energy device interface. Those "low level", physical details associated with each energy device interface are left to deal with to a corresponding power agent.

The power management unit 102 therefore deals with a normalized power bus 110 and sees each device connected to each one of the plurality of energy device interfaces 104 as one of an energy source, an energy load and an energy storage device accessing the power bus 110. The skilled addressee will appreciate that this is of great advantage over the prior art.

The power management unit 102 therefore controls how and when each power agent will interact with the power bus 110 at any time.

More precisely, the power management unit 102 generates instructions that are sent to each energy device interface over the control bus 108 using a packet-switched communication protocol. In a preferred embodiment, the control bus 108 operates using CAN (Controller Area Network) communication protocol. Other communication protocols known to the skilled addressee may alternatively be used.

In a preferred embodiment, the generated instructions (between the power management unit 102 and the energy device interface 112, 116, 120 and/or 124) are used for various operations such as, but not limited to: setting power limits (i.e. production of energy, storage of energy, consumption of energy) for a given power agent, reporting data associated with a current state of a power agent, determining presence or absence of a given power agent, establishing control set points, establishing agent calibration, performing diagnostic management of a given power agent (i.e. querying the power agent for firmware revision, etc.), providing firmware update functionality to a given power agent running in a given energy device interface, gathering operational statistics from a power agent, performing fault detection in a given power agent, containment and management of a given power agent, calibrating the power bus 110, determining a readiness to participate of a given power agent, determining an energy production cost of a given energy source, determining a maximum power production/consumption (source and load elements), determining a total storage capacity and an available reserve (storage element), obtaining data associated with a specific dedicated energy device to which the dedicated power agent is connected to, instructions for determining an available reserve in a dedicated energy storage device, an instruction for configuring the dedicated energy storage device for being in a charging state, in a discharging and a non-participating state, instruction for determining the readiness of a dedicated energy source.

On the other hand, it will be appreciated that the power management unit 102 performs higher level processing such as, but not limited to, logging power consumption/production/storage statistics, determining which power agent will contribute at any particular time (according to a control strategy), ensuring that all power agents are calibrated and are able to read the power bus 100 voltage correctly, keeping track of operating statistics for each power agent (e.g. battery resistance, solar cell efficiency, generator engine performance, etc.), scheduling a power agent (e.g. using weather information to decide on solar cell future contribution capacity or availability, or using geo-positioning data to disable a generator), optimizing energy costs based on feedback from the plurality of power agents, performing predictive maintenance in the case where a power agent supports this feature.

While it has been disclosed an embodiment of the power management unit 102, the skilled addressee will appreciate that various alternative embodiments may be provided.

In particular, the power management unit 102 may be comprised of various elements not shown in the figures such as for instance a communication port for enabling a connection of the power management to a processing unit.

In one embodiment, the processing unit comprises a server.

In another embodiment, the processing unit is one of a laptop, a desktop, a tablet computer and a smartphone.

In another embodiment, the processing unit comprises a GPS receiver.

It will be appreciated that the processing unit may be used for enabling a user to readily interact with the power management unit 102, etc.

The processing unit may be advantageously used for providing data used for generating the control strategy or for providing data to be used by the energy device interfaces (such as for instance failure contingency plan, energy and/or combustible prices, data associated with driver updates, etc). The processing unit may be used for enabling the user to readily input data used for generating the control strategy. Those data could be for instance an energy generation priority setting assigned to each interfaced energy source, a schedule, a threshold value and time of day to be set in order to enable or disable energy supply to a specific load, a setting that enables the redirection of energy surplus to the grid when a predetermined production capacity is available, etc.

Figure 3:
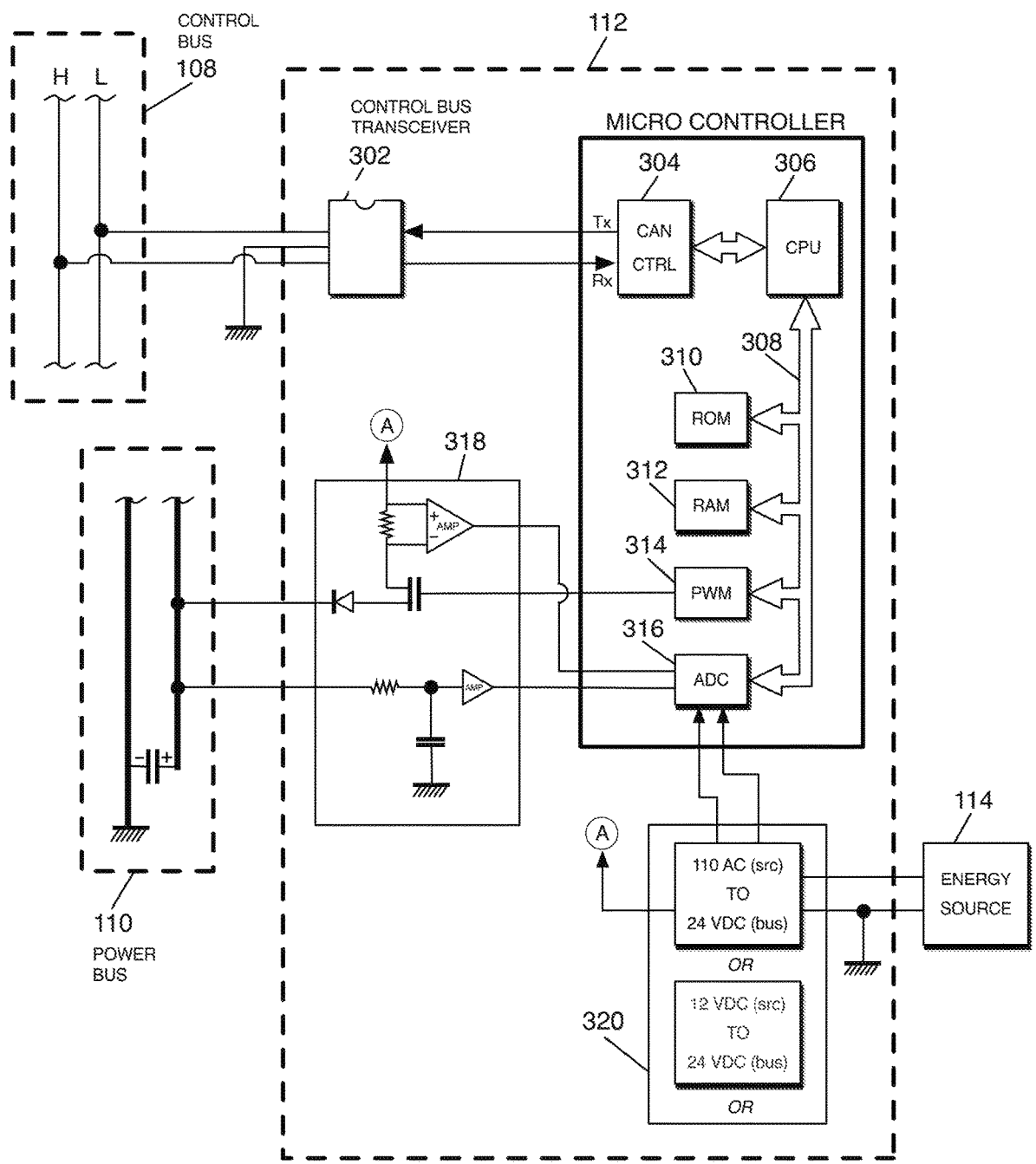
FIG. 3 is a block diagram which shows an embodiment of an energy device interface for connecting an energy source.

Now referring to FIG. 3, there is shown an embodiment of the energy device interface 112.

In this embodiment, the energy interface device 112 comprises a control bus transceiver 302; a micro controller comprising: a CAN controller 304, a CPU 306, a data bus 308, non-volatile memory (ex: ROM, Flash, EEPROM, etc.) 310, a RAM 312, an analog output conditioning module (represented as a PWM unit on the drawing) device 314, an ADC 316; a circuit 318 and a circuit 320.

The control bus transceiver 302 is used for connecting the energy device interface 112 to the control bus 108. The circuit 318 is used for connecting the analog output conditioning module (represented as a PWM unit on the drawing) device 314 as well as the ADC 316 to the power bus 110. The circuit 320 is used for connecting the micro controller to the energy source 114. Each of the CPU 306, the non-volatile memory (ex: ROM, Flash, EEPROM, etc.) 310, the RAM 312, the analog output conditioning module (represented as a PWM unit on the drawing) device 314 and the ADC 316 is interconnected via the data bus 308.

In a preferred embodiment, 302, 304, 306, 308, 310, 312, 314, 316 are all comprised into a single microcontroller unit such as the LPC11C12 manufactured by NXP.

While it has been disclosed an embodiment of the energy device interface 112 for connecting to the energy source 114, the skilled addressee will appreciate that various alternative embodiments may be provided. With regards to the plurality of energy device interfaces 104, it will be appreciated that in addition to the power connection with a corresponding one the devices selected from loads, sources and storage devices 106, an additional interface may be provided for the control, sensing, monitoring of a given energy device (e.g. start/stop, tank level, engine start, battery temperature, alternator regulation and temperature, Flywheel RPM, a J1939/ISO11783/NMEA2000 interface, power line communication, etc.).

Figure 4:
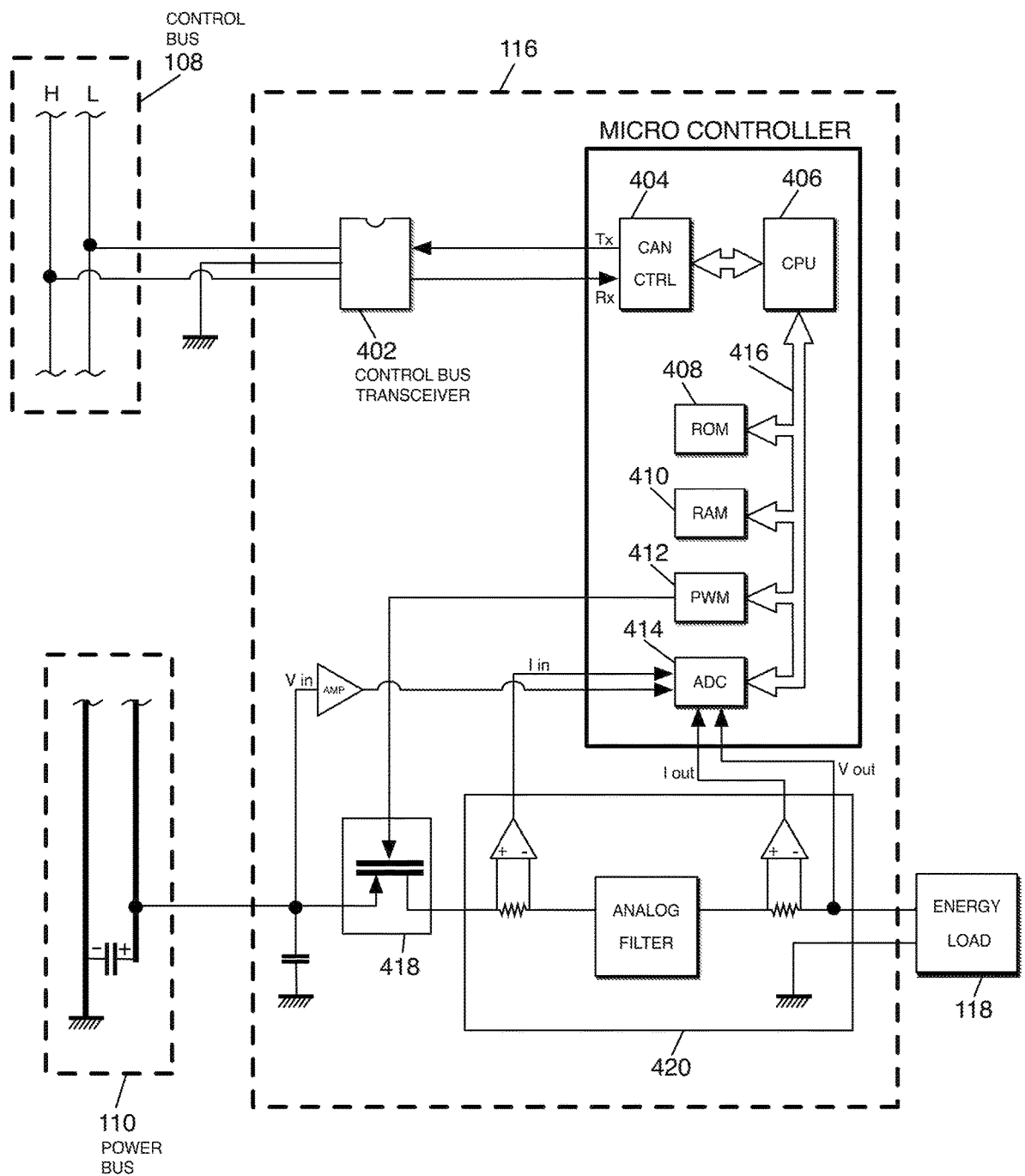
FIG. 4 is a block diagram which shows an embodiment of an energy device interface for connecting an energy load.

Now referring to FIG. 4, there is shown an embodiment of an energy device interface 116 for connecting the energy load 118.

More precisely and still in this embodiment, the energy device interface 116 comprises a control bus transceiver 402, a CAN controller 404, a CPU 406, a NVRAM 408, a RAM 410, a PWM device 412, an ADC 414 (10 bits in a preferred embodiment), a circuit 418 and another circuit 420. The CPU 406, the non-volatile memory (ex: ROM, Flash, EEPROM, etc.) 408, the RAM 410, the PWM (10 bits in a preferred embodiment) device 412 and the ADC 414 are each interconnected via data bus 416.

The control bus transceiver 402 is used for interconnecting the control bus 108 to the energy device interface 116 via the CAN controller 404. Circuit 418 is used for connecting the PWM 412 to the power bus 110.

The circuit 420 is used for connecting the energy device interface 116 to the energy load 118.

In a preferred embodiment, 402, 404, 406, 408, 410, 412, 414 and 416 are all comprised into a single microcontroller unit such as the LPC11C12 manufactured by NXP.

While an embodiment of an energy device interface 116 has been shown for connecting to the energy load 118, the skilled addressee will appreciate that various alternative embodiments may be provided.

Figure 5:
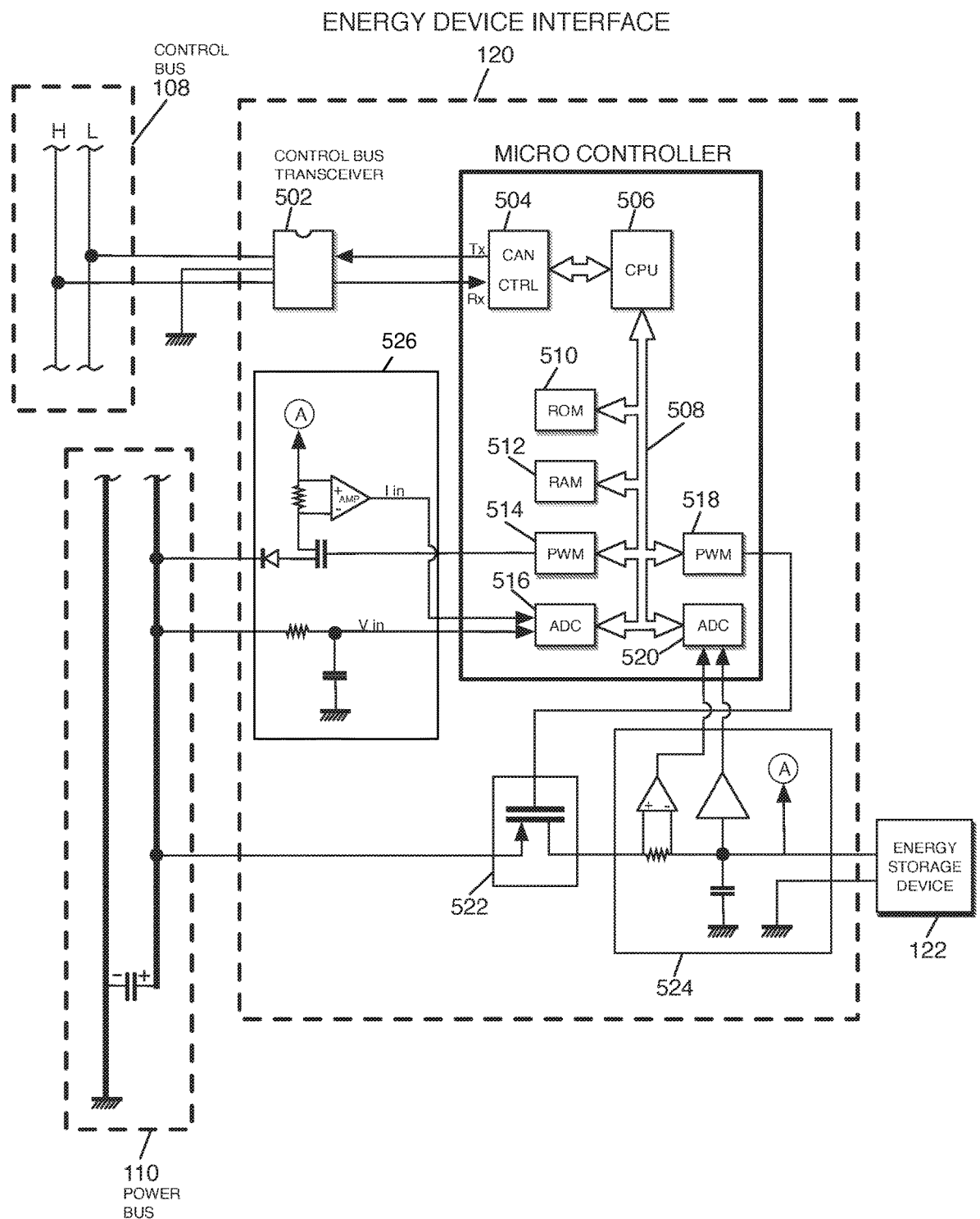
FIG. 5 is a block diagram which shows an embodiment of an energy device interface for connecting an energy storage device.

Now referring to FIG. 5, there is shown an embodiment of the energy device interface 120 for connecting the energy storage device 122.

In this embodiment, the energy device interface 120 comprises a control bus transceiver 502, a CAN controller 504, a CPU 506, a data bus 508, non-volatile memory (ex: ROM, Flash, EEPROM, etc.) 510, a RAM 512, a PWM (10 bits in a preferred embodiment) device 514, an ADC 516, a PWM (10 bits in a preferred embodiment) device 518 and an ADC 520. It will be appreciated that each of the CPU 506, the non-volatile memory (ex: ROM, Flash, EEPROM, etc.) 510, the RAM 512, the PWM 514, the ADC 516, the PWM 518 and the ADC 520 are interconnected via the data bus 508.

The control bus transceiver 502 is used for interconnecting the energy device interface 120 to the control bus 108. Circuit 526 is used for interconnecting the PWM device 514 and the ADC 516 to the power bus 110. It will be appreciated that the power bus 110 is further connected to the PWM device 518 via circuit 522. The energy storage device 122 is interconnected to the ADC 520 via circuit 524.

In a preferred embodiment, 502, 504, 506, 510, 512, 514, 516, 518, 520 and 508 are all comprised into a single microcontroller unit such as the LPC11C12 manufactured by NXP.

It will be appreciated that a power agent is running in each of the plurality of energy device interfaces 104. It will be appreciated that the power agent is a microprocessor-controlled interface that encapsulates all of the details regarding a given one of an energy source, an energy load and an energy storage device connected to the energy device interface. The power agent provides a normalized power interface with the power bus 110.

It will be appreciated that some parts of a power agent are not shared with the power management unit 102. The purpose of such design is to create a level of abstraction between the power management unit 102 and the power agent.

The skilled addressee will further appreciate that the power agent can be controlled by the power management unit 102.

The power agent typically receives a power request from the power management unit 102 and operates its local hardware in order to respond to the request in a timely fashion.

While it has been disclosed an embodiment of an energy device interface 120, the skilled addressee will appreciate that various alternative embodiments of the energy device interface 120 may be further provided.

Figure 6:
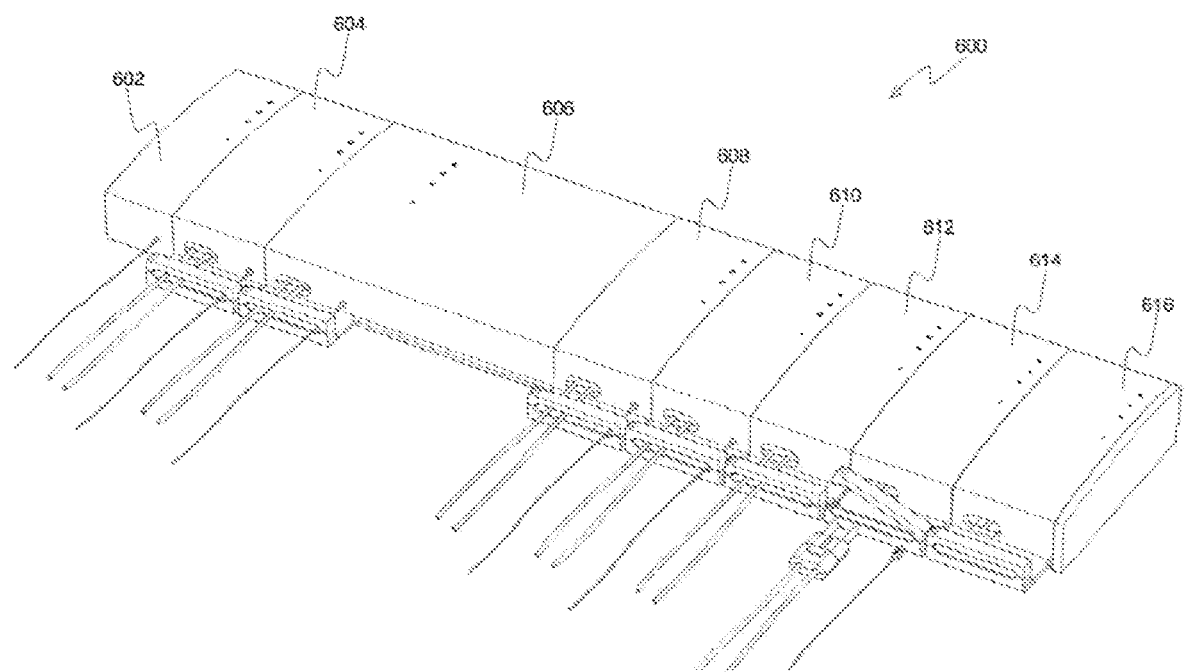
FIG. 6 is a front perspective view of a first embodiment of a system for managing interactions between a plurality of devices.

Now referring to FIG. 6, there is shown a first embodiment of a system 600 for managing interactions between a plurality of devices.

More precisely and as shown in FIG. 6, the system 600 comprises a power management unit 602, a first energy device interface 604, a second energy device interface 606, a third energy device interface 608, a fourth energy device interface 610, a fifth energy device interface 612, a sixth energy device interface 614 and a seventh energy device interface 616.

Each of the first energy device interface 604, the second energy device interface 606, the third energy device interface 608, the fourth energy device interface 610, the fifth energy device interface 612, the sixth energy device interface 614 and the seventh energy device interface 616 is used for connecting a corresponding one of an energy source, an energy load and an energy storage device to a power bus, not shown.

Figure 7:
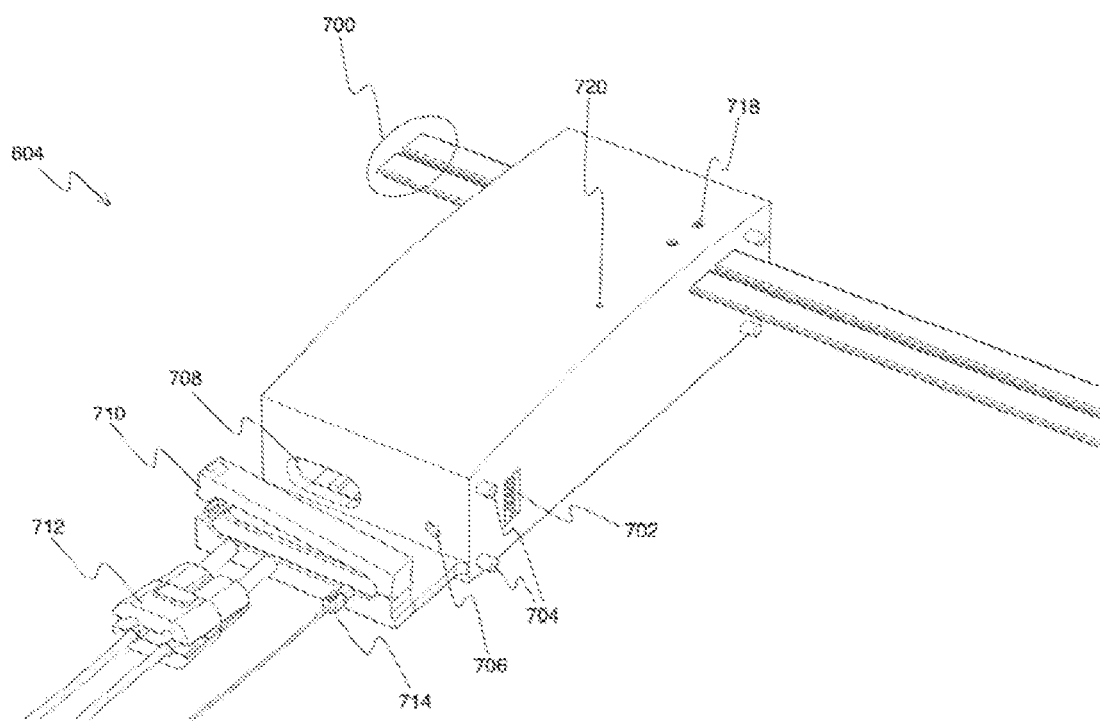
FIG. 7 is a front perspective view of an energy device interface of the system for managing interactions between a plurality of devices.

Now referring to FIG. 7, there is shown an embodiment of the first energy device interface 604. In this embodiment, the power bus 700 is inserted inside the first energy device interface 604. The first energy device interface 604 further comprises a control bus connector 702, module guides 704, an external control connector 706, a power connector 708, a cable management locking mechanism 710, a power bus locking mechanism 718 and status LEDs 720.

The power bus locking mechanism 718 is used for locking the power bus 700 once it is inserted in the first energy device interface 604.

The power connector 708 is used for receiving a corresponding power connector 712 from a given one of the energy source, the energy load and the energy storage device.

The external control connector 706 is used for receiving a corresponding external connector or probe 714.

The cable management locking mechanism 710 is used for ensuring tight connection of the corresponding power connector 712 and the corresponding external connector or probe 714 to the first energy device interface 604.

The module guides 704 are used for tightly securing the first energy device interface 604 to a neighboring module, not shown.

The status LEDs 720 are used for providing a visual indication of an operating status of the first energy device interface 604.

Figure 8:
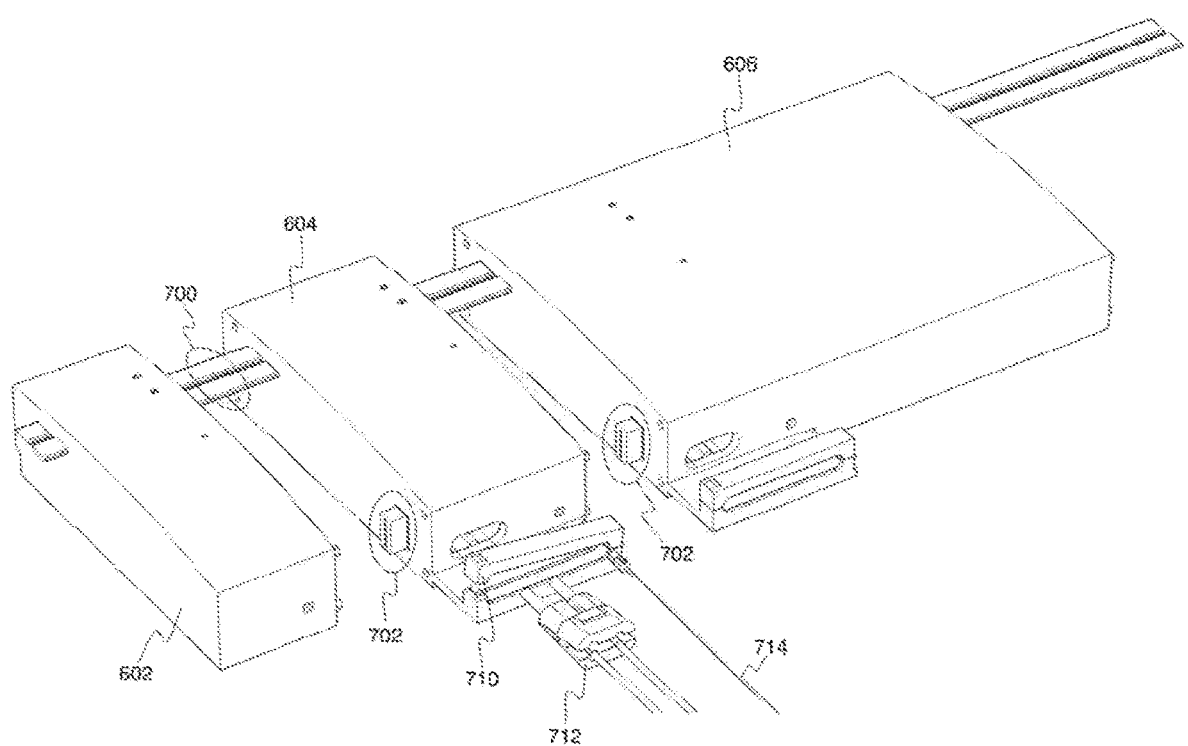
FIG. 8 is a front perspective view and exploded view of the first embodiment of the system for managing interactions between a plurality of devices.

Now referring to FIG. 8, there is shown an embodiment of the first energy device interface 604 together with the power management unit 602 and the second energy device interface 606.

As shown, the power bus 700 is inserted in each of the first energy device interface 604, the power management unit 602 and the second energy device interface 606.

It will be appreciated that the moving of each module against another neighboring modules creates a connection between each control bus connector 702.

Figure 9:
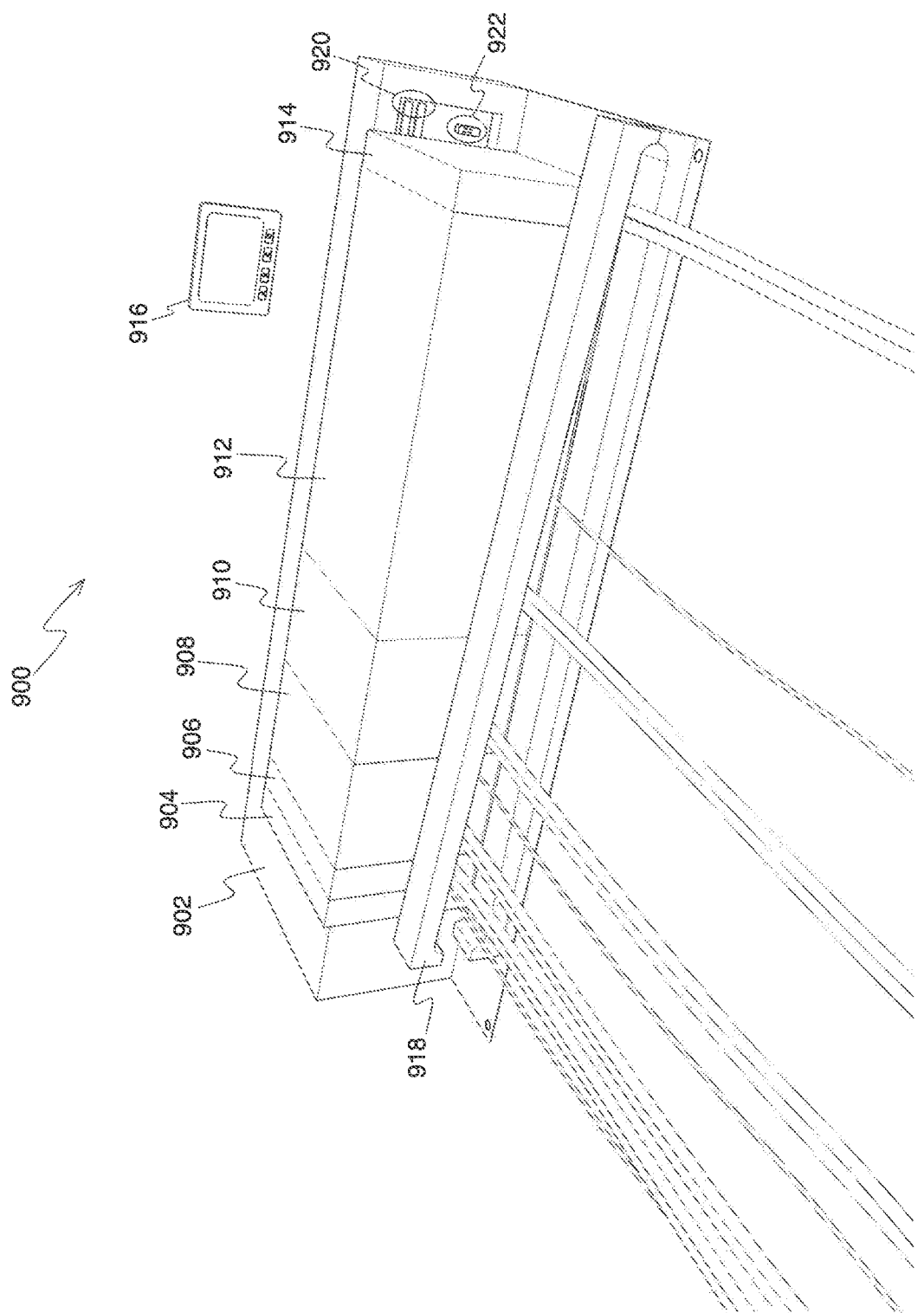
FIG. 9 is a front perspective view of a second embodiment of a system for managing interactions between a plurality of devices.

Now referring to FIG. 9, there is shown another embodiment of a system 900 for managing interactions between a plurality of devices.

In this embodiment, the system 900 comprises a frame 902, a first energy device interface 904, a second energy device interface 906, a third energy device interface 908, a fourth energy device interface 910, a fifth energy device interface 912 and a sixth energy device interface 914.

It will be appreciated that the frame comprises a power bus 920 and a control bus 922. It will be further appreciated that an optional user interface, an embodiment of which is a flat screen monitor 916, is provided.

As further shown in FIG. 9, the frame 902 further comprises a cable management locking mechanism 918 for ensuring tight connection of cables connected to each of the first energy device interface 904, the second energy device interface 906, the third energy device interface 908, the fourth energy device interface 910, the fifth energy device interface 912 and the sixth energy device interface 914.

It will be appreciated that in this embodiment the frame 902 comprises the power management unit.

Figure 10:
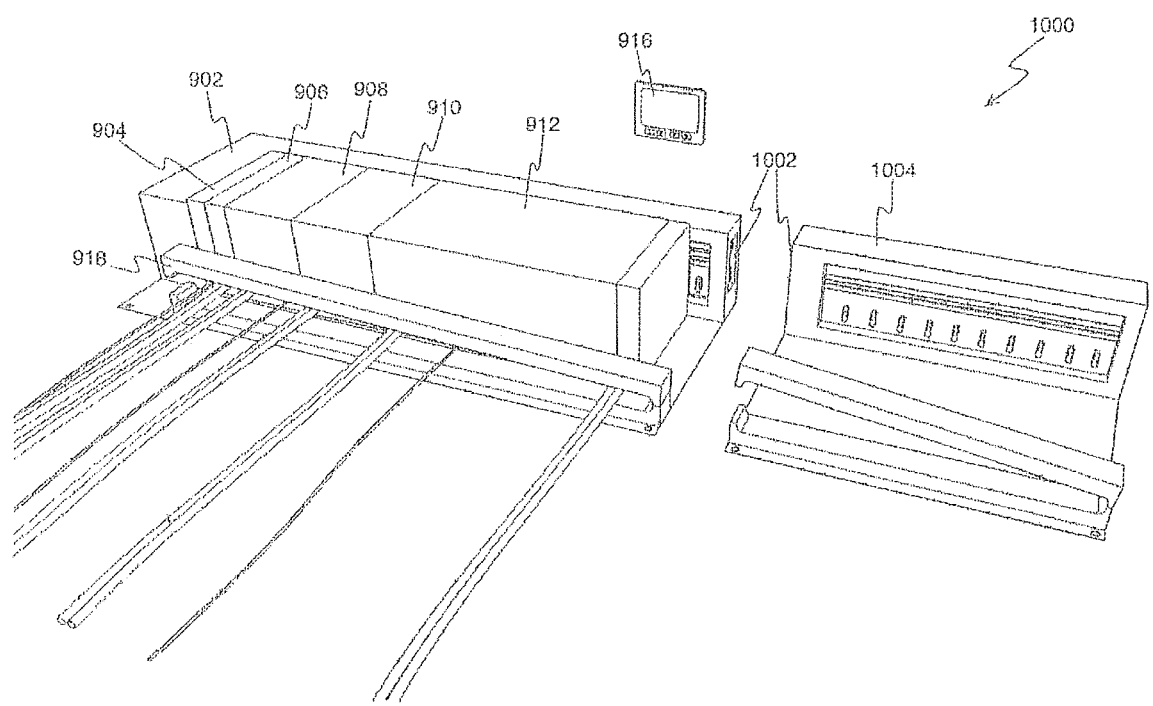
FIG. 10 is a front perspective view of the second embodiment of a system for managing interactions between a plurality of devices showing a main frame and an extension module supporting module addition.

Now referring to FIG. 10, there is shown a second embodiment of a system for managing interactions between a plurality of devices 1000 showing a frame 902 and an extension module 1004 supporting module addition. It will be appreciated that each of the frame 902 and the extension module 1004 comprises interconnection means 1002 for operatively interconnecting the extension module 1004 to the frame 902. The skilled addressee will appreciate that this is of great advantage for scalability purposes.

The invention claimed is:

1. A system for managing interactions between a plurality of devices selected from a group consisting of energy sources, energy loads and energy storage devices, the system comprising:
a control bus; a power bus;
a plurality of energy device interfaces, each energy device interface comprising a control bus port, a power bus port and a device port, the device port for operatively connecting the energy device interface to a corresponding device selected from the group consisting of energy sources, energy loads and energy storage devices and for controlling the corresponding device, the energy device interface being operatively connected to the control bus via the control bus port and to the power bus via the power bus port,
wherein each of the plurality of energy device interfaces comprises a dedicated power agent for operating the corresponding device, wherein each dedicated power agent directly manages low level physical details associated with operating the corresponding device such that each power agent provides a normalized power interface with the power bus;
a power management unit operatively connected to the control bus, the power management unit configured to control each of the plurality of energy device interfaces according to a determined control strategy to thereby control interactions between the plurality of corresponding devices by controlling how and when each power agent interacts with the power bus at any time;
wherein the low level physical details directly managed by any one of the dedicated power agents are not shared with the power management unit.

2. The system as claimed in claim 1, wherein the energy sources are selected from a group consisting of utility grid, hydro generators, fuel cells, alternators, generators, energy sources using regenerative braking systems, energy sources using geothermal power and energy sources using nuclear power, high and low-power energy harvesting technologies including photovoltaic power generation, wind generators and hydro generators.

3. The system as claimed in claim 1, wherein the energy storage devices are selected from a group consisting of battery arrays and batteries, super-capacitors, flywheels, devices using compressed air storage, devices using pumped hydro storage, devices using gravity and devices using thermal energy storage.

4. The system as claimed in claim 1, wherein the control strategy is determined using at least one of user-specified parameters, constraints and goals.

5. The system as claimed in claim 1, wherein the dedicated power agent receives a power request instruction from the power management unit via the control bus and operates the corresponding device accordingly.

6. The system as claimed in claim 1, wherein the power management unit receives a feedback signal from at least one of a plurality of dedicated power agents.

7. The system as claimed in claim 1, wherein at least one energy device interface receives a feedback signal from a corresponding device selected from a group consisting of energy sources, energy loads and energy storage devices to which the energy device interface is connected to.

8. The system as claimed in claim 7, wherein the feedback signal comprises at least one of presence or absence of power originating from the corresponding energy device, sensor reading from the corresponding energy device, data originating from the corresponding energy device.

9. The system as claimed in claim 1, wherein the control bus operates using a packet-switched communication protocol.

10. The system as claimed in claim 1, wherein the power management unit further generates instructions to be transmitted to the dedicated power agent, the instructions being selected from a group consisting of an instruction for setting power limits, an instruction for reporting data associated with a current state of the dedicated power agent, an instruction for determining a presence or an absence of the dedicated power agent, an instruction for establishing control set points, an instruction for establishing agent calibration, an instruction for performing a diagnostic management of the dedicated power agent, an instruction for providing a firmware update functionality for the dedicated power agent, an instruction for gathering operational statistics from the dedicated power agent, an instruction for determining a containment and management of the dedicated power agent, an instruction for obtaining data associated with a specific dedicated energy device to which the dedicated power agent is connected to.

11. The system as claimed in claim 10, wherein the dedicated power agent is used for operating a dedicated energy source from a plurality of energy sources, wherein the instructions further comprise at least one of an instruction for determining an energy cost of the dedicated energy source, an instruction for determining a maximum power production for the dedicated energy source and an instruction for determining a readiness state of the dedicated energy source.

12. The system as claimed in claim 10, wherein the dedicated power agent is used for operating a dedicated energy load from a plurality of energy loads, wherein the instructions further comprise an instruction for determining a maximum power consumption for the dedicated energy load.

13. The system as claimed in claim 10, wherein the dedicated power agent is used for operating a dedicated energy storage device from a plurality of energy storage devices, wherein the instructions further comprise at least one of an instruction for determining a total energy storage capacity for the dedicated energy storage device and an instruction for determining an available reserve in the dedicated energy storage device, an instruction for configuring the dedicated energy storage device for being in charging state, a discharging state and a non-participating state.

14. The system as claimed in claim 1, wherein the power management unit is further adapted for performing at least one of logging power consumption/production/storage statistics, determining if the dedicated power agent will contribute at any particular time, determining if the dedicated power agent is calibrated, keeping track of operating statistics for the dedicated power agent, scheduling the dedicated power agent, optimizing energy costs based on feedback from the dedicated power agent and performing predictive maintenance in case the dedicated power agent supports such feature.

15. The system as claimed in claim 1, wherein the power management unit further comprises a communication port for enabling a connection to a processing unit.

16. The system as claimed in claim 15, wherein the power management unit further comprises a control strategy determining unit, wherein the processing unit is used for providing data, further wherein the data provided by the processing unit is used by the control strategy determining unit for generating the control strategy.

17. The system as claimed in claim 15, wherein the processing unit is used for providing data, further wherein the data provided by the processing unit is used by the plurality of energy device interfaces.

18. A method for managing interactions between a plurality of devices selected from a group consisting of energy sources, energy loads and energy storage devices, the method comprising:
  providing a system comprising:
    a control bus;
    a power bus;
    a plurality of energy device interfaces, each energy device interface comprising a control bus port, a power bus port and a device port, the device port for operatively connecting the energy device interface to a corresponding device selected from the group consisting of energy sources, energy loads and energy storage devices and for controlling said corresponding device, the energy device interface being operatively connected to the control bus via the control bus port and to the power bus via the power bus port,
    wherein each of the plurality of energy device interfaces comprises a dedicated power agent for operating the corresponding device, wherein each dedicated power agent directly manages low level physical details associated with operating the corresponding device such that each power agent provides a normalized power interface with the power bus;
    a power management unit operatively connected to the control bus, the power management unit configured to control each of the plurality of energy device interfaces according to a determined control strategy to thereby control interactions between the plurality of corresponding devices;
  operatively connecting each of the plurality of devices selected from a group consisting of energy sources, energy loads and energy storage devices to a corresponding energy device interface of the plurality of energy device interfaces;
  determining a control strategy using an identification of the plurality of devices selected from a group consisting of energy sources, energy loads and energy storage devices;
  applying the determined control strategy to thereby manage the interactions between the plurality of corresponding devices by controlling how and when each power agent interacts with the power bus at any time;
  wherein the low level physical details directly managed by any one of the dedicated power agents are not shared with the power management unit.

19. The method as claimed in claim 18, further comprising a user providing at least one of user-specified parameter data, constraint data and goals data, further wherein the control strategy is determined using the provided at least one of user-specified parameter data, constraint data and goals data.

* * * * *